United States Patent [19]
Miyazaki

[11] Patent Number: 5,821,912
[45] Date of Patent: Oct. 13, 1998

[54] PLASMA-ADDRESSED DISPLAY DEVICE

[75] Inventor: Shigeki Miyazaki, Kanagawa, Japan

[73] Assignee: Sony Corporation, Tokyo, Japan

[21] Appl. No.: 763,872

[22] Filed: Dec. 11, 1996

Related U.S. Application Data

[63] Continuation-in-part of Ser. No. 334,356, Nov. 3, 1994, abandoned.

[30] Foreign Application Priority Data

Nov. 5, 1993 [JP] Japan ..................... 5-301333

[51] Int. Cl.$^6$ ....................................... G09G 3/28
[52] U.S. Cl. ................. 345/60; 313/580; 349/58
[58] Field of Search ................. 345/60, 62, 87; 359/54, 55; 313/580, 584, 586; 349/58

[56] References Cited

U.S. PATENT DOCUMENTS

| 5,361,080 | 11/1994 | Kwon | 345/87 |
|---|---|---|---|
| 5,420,707 | 5/1995 | Miyazaki | 345/60 |
| 5,436,634 | 7/1995 | Kanazawa | 345/60 |
| 5,674,634 | 10/1995 | Wang et al. | 428/688 |
| 5,723,945 | 4/1996 | Schermerhorn | 313/581 |

FOREIGN PATENT DOCUMENTS 0500085  8/1992  European Pat. Off. .

*Primary Examiner*—Amare Mengistu
*Attorney, Agent, or Firm*—Hill & Simpson

[57] ABSTRACT

A plasma-addressed display device whose discharge is stabilized and which is thereby suitable for the mass production of large plasma-addressed display devices having a size in the order of meters, comprising: a first substrate having a plurality of data electrodes arranged in parallel to each other; a dielectric sheet, the first substrate and the dielectric sheet being disposed face-to-face to form a display chamber therebetween; a second substrate having a plurality of discharge electrodes, and a plurality of barrier ribs each of which is located on one of the discharge electrodes to define a discharge channel between adjacent barrier ribs, the second substrate and the dielectric sheet being disposed face-to-face to form a discharge chamber therebetween, the data electrodes and discharge channel being arranged so that they are spaced apart in the vertical and horizontal directions, respectively, each of the discharge electrodes having a width larger than the respective one barrier rib in such a manner that the pair of the discharge electrodes belonging to each of the discharge channels be exposed on the glass substrate at the bottom of the corresponding barrier for a length of 40 $\mu$m or more as measured along the width direction of the discharge chamber.

8 Claims, 5 Drawing Sheets

PLASMA-ADDRESSED DISPLAY DEVICE

This is a continuation-in-part, of application Ser. No. 08/334,356, filed Nov. 3, 1994 now abandoned.

BACKGROUND OF THE INVENTION

The present invention relates to a plasma-addressed display device comprising a display chamber superposed on a plasma chamber, with a dielectric sheet incorporated therebetween. More specifically, the present invention relates to a shape of a discharge electrode fabricated on the plasma chamber.

A plasma-addressed display device has been disclosed in, for example, JP-A-4-265931 (the term "JP-A-" as referred herein signifies "unexamined published Japanese patent application"; it corresponds to U.S. Ser. No,. 837,961 filed on Feb. 20, 1992). The structure of a conventional plasma-addressed display device is described briefly below. Referring to FIG. 7, a plasma-addressed display device comprises a flat panel structure composed of a display chamber and a plasma chamber 102 with a dielectric sheet 103 incorporated therebetween. The display chamber 101 comprises an upper glass substrate 104. Signal electrodes D made from a transparent conductive sheet and arranged in parallel with each other are disposed on the inner surface of the upper glass substrate 104. The glass substrate 104 is adhered to the dielectric sheet 103, and is disposed from the dielectric sheet 103 at a predetermined distance by incorporating spacers 105. A liquid crystal layer 106 is formed by filling the space between the dielectric sheet 103 and the glass substrate 104 with an electro-optical material, i.e., a liquid crystal. A plasma chamber 102 comprises a lower glass substrate 107. Discharge electrodes 108 are formed in stripes on the inner surface of the glass substrate 107 in such a manner that they make right angles with respect to the signal electrodes D. The discharge electrodes each function as an anode A or a cathode K in turn. Barrier ribs 109 are each formed on the upper side of each of the discharge electrodes 108. The apices of the barrier ribs 109 are brought into contact with the dielectric sheet 103 so that the barrier ribs 109 may function as spacers. A frit sealing material 110 is used to adhere the glass substrate 107 to the dielectric sheet 103. In this manner, an airtight space is provided between the glass substrate 107 and the dielectric sheet 103. The resulting space is partitioned or divided by the barrier ribs 109 into individual portions to provide discharge channels 111 which function as the scanning units. Each of the discharge channels 111 is filled with an ionizable gas such as helium, neon, argon, or a mixed gas thereof.

The plasma-addressed display device described in the foregoing can be driven by selectively scanning the discharge channels 111 in line-at-a-time manner while synchronously supplying the predetermined image signal to the signal electrodes D. In selecting each of the discharge channels, a high voltage is applied to the anodes A and the cathodes K to generate a plasma discharge. The electric field that is obtained as a result in the discharge channels 111 is not of a uniform one as such obtained in a capacitor of a parallel plate type, but is of a non-uniform type having a parabolic intensity distribution. By principle, the electric field concentrates particularly in the edge portion of the discharge electrodes. Moreover, local concentration of the electric current intensifies in case the discharge electrodes are fabricated by screen printing or a like process, because the discharge electrodes formed by such a process result in a shape having numerous protrusions. An intensive concentration of current leads to the formation of local arc discharge, thereby hindering the formation of a uniform and stable glow discharge. In general, a stable and uniform discharge is obtained by setting the gas pressure inside the discharge channel and the applied voltage at such values to prevent breakdown from occurring on the ends of the electrodes. That is, the surface portion on the inner side of the electrode is utilized while excluding the ends of the electrodes to a certain extent. This measure, however, is not yet sufficient for realizing a stable and uniform discharge. The presence of a dielectric in the form of barrier ribs also contributes to the formation of a non-uniform discharge. Thus, considering the structure, a stable discharge becomes more unfeasible with decreasing exposed area of the discharge electrodes. It can be seen from the foregoing that the insufficient consideration on the exposed area of the electrode prevented stable operation of a plasma-addressed display device from being established.

SUMMARY OF THE INVENTION

In the light of the aforementioned circumstances, the present invention aims to overcome the technological problems of the prior art technology. Hence, an object of the present invention is to provide a plasma-addressed display device in which the discharge is stabilized. Accordingly, the object of the present invention is achieved in one aspect by a plasma-addressed display device comprising, as the basic constitution, a display chamber superposed on a plasma chamber superposed with a dielectric sheet interposed therebetween. The plasma chamber is defined by a substrate and a dielectric sheet adhered thereto with a space incorporated therebetween. The substrate utilized in the plasma chamber comprises discharge electrodes provided in relatively wide stripes, and relatively narrow barrier ribs provided thereon. The apices of the barrier ribs are brought into contact with the dielectric sheet in such a manner to divide the space into portions. In this manner, discharge channels are formed between every two neighboring barrier ribs. Furthermore, the plasma-addressed display device according to the present invention is characterized in that each pair of discharge electrodes belonging to the respective discharge channels is disposed on the glass substrate at the bottom of the corresponding barrier rib and is exposed for a length of 40 $\mu$m or more as measured along the width direction of the plasma-addressed display device. The length of the exposed portion of the electrodes in the width direction is not more than 50 percent of the pitch of the electrodes. The discharge electrodes and the barrier ribs are formed by printing, for example, a relatively wide conductive pattern and a narrower insulating pattern superposed thereon by using the same screen mask.

An apparent correlation is found between the exposed width of the discharge electrode and the state of discharge. A stabler discharge can be generated more easily by increasing the exposed width of the discharge electrode. The discharge is influenced predominantly by the width of the exposed electrode (referred to simply hereinafter as "the exposed electrode width") on the cathode side. Thus, attention must be paid to the exposed electrode width on the cathode side rather than that on the anode side. A stable plasma discharge can be achieved by establishing an exposed electrode width of 40 $\mu$m or more on the cathode side. However, if the exposed electrode width on the cathode side is reduced to less than 40 $\mu$m, arc discharge tends to generate to make a stable discharge unfeasible. Concerning the exposed electrode width on the anode side, no stable plasma discharge can be obtained at a width of less than 40 $\mu$m.

As described in the foregoing, the plasma-addressed display device according to the present invention comprises the discharge electrodes disposed in such a manner that each of the pairs of electrodes belonging to the respective discharge channels is exposed on the glass substrate at the bottom of the corresponding barrier rib for a length of 40 μm or more along the width direction of the discharge chamber. Thus, the generation of unfavorable discharge can be substantially removed to enable a uniform and stable line-at-a-time scanning of the discharge channels. Furthermore, the product yield of the plasma-addressed display device can be improved by thus eliminating the problem of generating unfavorable discharge. By using the same screen mask for the fabrication of both the discharge electrodes and the barrier ribs, alignment errors can be minimized to thereby reduce the alignment margin which has been conventionally determined with positional misalignment taken into consideration. This leads to the formation of finer discharge electrodes, thereby improving the aperture ratio of the plasma-addressed display device. Furthermore, the plasma-addressed display device according to the present invention can be readily applied to the mass production of large area plasma-addressed display devices whose size is in the order of meters.

DESCRIPTION OF THE PREFERRED EMBODIMENTS

The present invention is described in further detail below referring to the preferred embodiment according to the present invention. It should be understood, however, that the present invention is not to be construed as being limited to the examples below.

Figure 1:
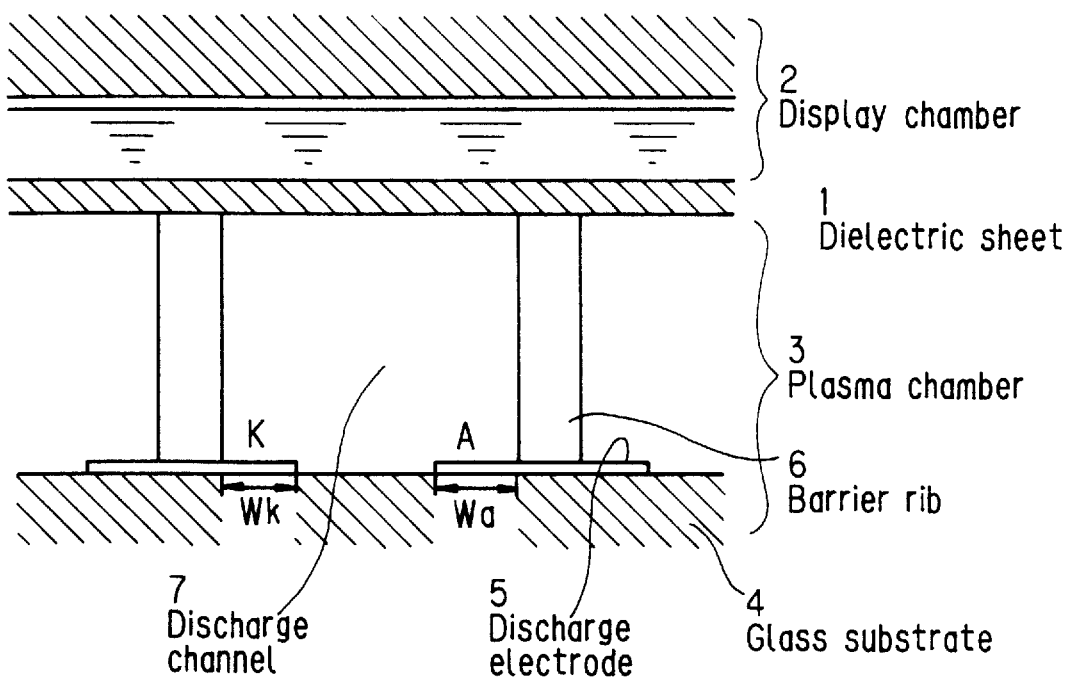
FIG. 1 is a schematically drawn partial section view showing the basic constitution of a plasma-addressed display device according to the present invention.

Referring to FIG. 1, which is a schematically drawn partial section view showing the basic constitution of a plasma-addressed display device according to the present invention, the plasma-addressed display device is equipped with a display chamber 2 superposed on a plasma chamber 3 with a dielectric sheet 1 interposed therebetween. A glass substrate 4 is joined with the dielectric sheet 1, but is disposed at a distance to define a space for the plasma chamber 3. The glass substrate comprises discharge electrodes 5 formed in relatively wide stripe patterns and barrier ribs 6 formed thereon narrower than the discharge electrodes. The apices of the barrier ribs 6 are each brought into contact with the dielectric sheet 1 to divide the space into portions corresponding to discharge channels 7. Thus, discharge channels 7 are provided between every two neighboring barrier ribs. The discharge channels 7 are each filled with an ionizable gas at a predetermined pressure. Each of the pairs of discharge electrodes 5 belonging to the discharge channel 7 provides a pair of anode A and cathode K for the respective discharge channel. Plasma discharge can be formed inside the discharge channel by applying a high voltage to the pair of cathode and anode. The plasma-addressed display device according to the present invention is characterized in that the pairs of discharge electrodes incorporated in the discharge channels are each exposed on the glass substrate at the bottom of the barrier ribs for a length of 40 μm or more as measured along the width direction of the plasma-addressed display device. More specifically, the exposed electrode width on the anode side, Wa, and that on the cathode side, Wk, are each 40 μm or longer. The exposed part of the electrodes in the width direction occupies no more than 50 percent of the electrode pitch. The discharge electrodes 5 and barrier ribs 6 disposed in this specified constitution can comprise, for example, a relatively wide printed conductive pattern and a narrower printed insulator pattern formed thereon, which are both fabricated by using the same screen mask. The total width of the discharge electrodes 5 can be set at, for example, about 210 μm, while setting the array pitch to about 400 μm. The discharge electrodes 5 are provided at a thickness of about 15 μm. Furthermore, the height and the width of the barrier ribs 6 are set at about 200 μm and 110 μm, respectively. An ultra-thin glass sheet about 0.05 mm in thickness can be provided as the dielectric sheet 1. The glass substrate may have a thickness of, for instance, about 1.1 mm.

If the exposed width of the discharge electrode is reduced, a local and non-uniform discharge tends to occur due to the generation of an uneven electric field. This leads to the partial generation of an arc discharge as a consequence of elevated current density. The minimum width for the exposed electrode necessary for generating a stable and uniform discharge is about 40 μm. This was confirmed by fabricating three samples of plasma chamber and conducting an experiment thereon. The planar view of the thus fabricated three sample plasma chambers are given in FIGS. 2 to 4. The size and the positional relation of the discharge electrodes and the barrier ribs are varied intentionally. The degree of modification differs sample by sample. In each of the three samples, furthermore, the arrangement pitch of the discharge electrodes and the barrier ribs is differed individually. Accordingly, the positional relation of the discharge electrodes and the barrier ribs is gradually shifted within a single plasma chamber. Thus, it can be seen that the exposed electrode width is varied from 0 to 260 μm. Cathodes and anodes in the discharge electrodes are disposed in turn from the edge on the left hand side to the edge on the right hand side in the order of cathode K, anode A, cathode K, anode A, and so on.

Figure 2:
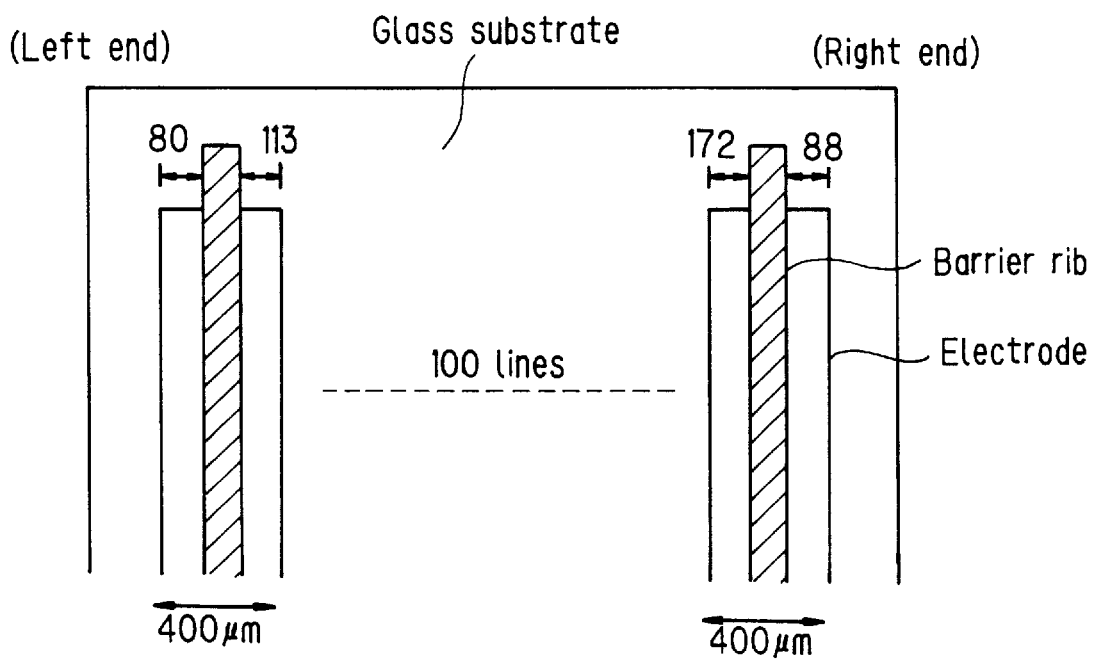
FIG. 2 is a plan view of a plasma chamber according to an embodiment of the present invention, on which the evaluation of the plasma-addressed display device according to the present invention was made.

Referring to FIG. 2, in which a plasma chamber according to an embodiment of the present invention is shown, the displacement between the discharge electrodes and the barrier ribs is relatively small. Thus, this is an example of a plasma discharge chamber having a large exposed width of the discharge electrodes. More specifically, it can be seen from the figure that at least about 80 μm of exposed width is assured. The ionizable gas was sealed inside each of the discharge channels at a pressure of about 25 Torr, and a high voltage in the range of from 300 to 380 V was applied to the anode and the cathode. Thus, plasma discharge was observed to generate regularly in the present plasma chamber without any problem.

Figure 3:
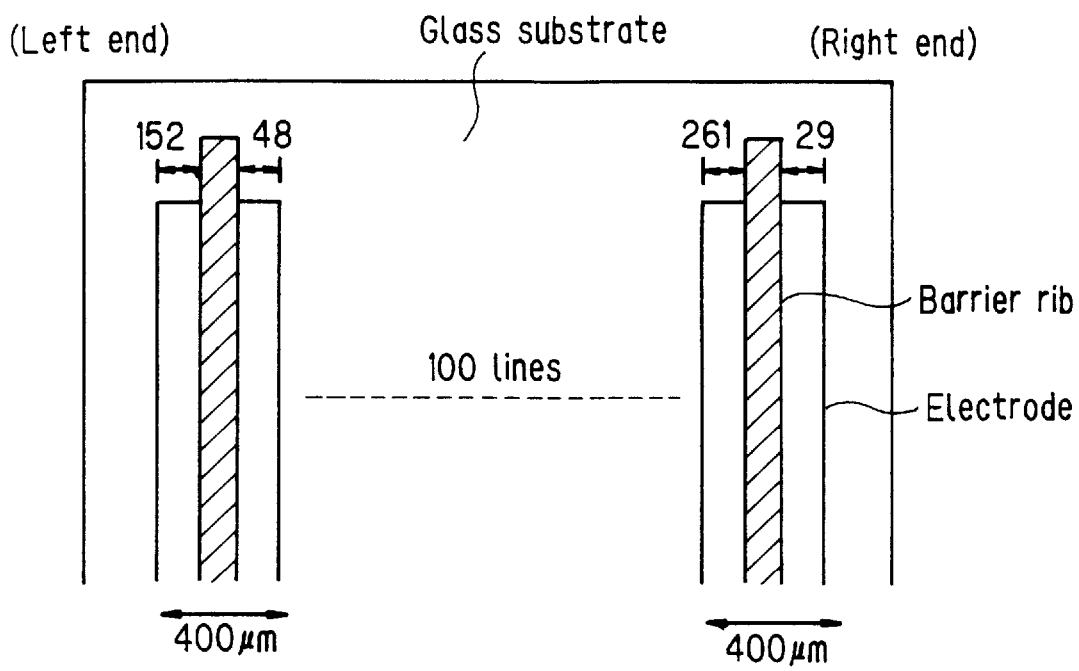
FIG. 3 is a plan view of another plasma chamber provided as an example.

Referring to FIG. 3, another plasma chamber provided as an example is described. The displacement between the discharge electrodes and the barrier ribs is increased. More specifically, the exposed electrode width on the end of the right hand side is reduced to a minimum value of 29 μm. An exposed electrode width of 48 μm is assured on the end of the left hand side. Plasma discharge is observed to generate on the several lines located on the end of left hand side in which the displacement is relatively small, however, substantially no plasma discharge generates on the other lines in which the discharge electrodes are largely displaced from the barrier ribs. Although no arc discharge is generated, the behavior is extremely unstable. Considering the lines generating discharge, it can be seen that the lines corresponding to even numbers generate the discharge but those corresponding to odd numbers do not. This is ascribed to the fact that the discharge occurs only on the lines having a larger exposed width on the cathode side as compared with the exposed width on the anode side. Thus, discharge does not occur on the odd lines having a larger width exposed on the anode side as compared with the width on the cathode side. Hence, odd lines were observed to generate discharge by reversing the anodes and the cathodes.

Figure 4:
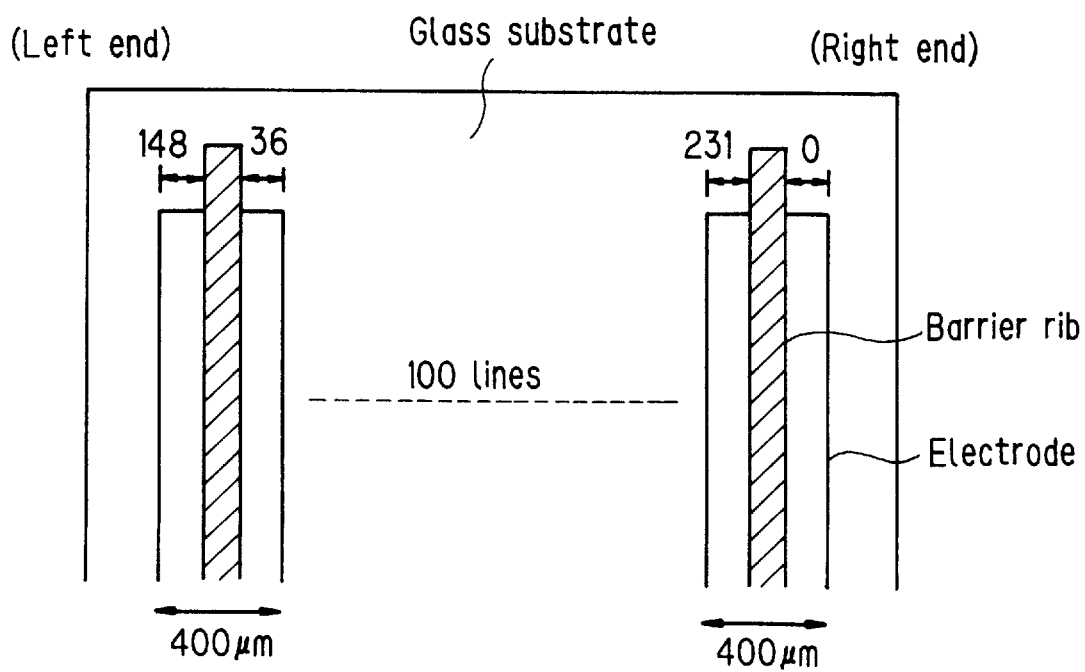
FIG. 4 is a plan view of a still other plasma chamber provided as another example.

Referring to FIG. 4, a still other plasma chamber according to another example is described. The displacement provided between the discharge electrodes and the barrier ribs is maximized. More specifically, the exposed electrode width on a single side is reduced to less than 40 μm. It can be seen that arcs run in the glow discharge. Obviously, the discharge behavior is different from those obtained in the plasma chambers with reference to FIGS. 2 and 3. No regular discharge was obtained on the plasma chamber in spite of the adjusted gas pressure and applied voltage.

In the plasma chambers described in the foregoing, however, it has been found that a higher discharge current density is obtained by partially removing the barrier ribs. This signifies that the barrier ribs make the discharge unstable. In particular, the discharge is more unstable for a plasma chamber having the barrier ribs on the anode side as compared with a chamber having no barrier ribs. With increasing applied voltage, a plasma chamber having barrier ribs on the anode side of the discharge electrodes is observed to darken gradually from the initial bright state, and to finally maintain a constant darkness. With further increasing the voltage, the same sequence in brightness is observed to occur repeatedly as if a negative feedback is applied to the chamber. This can be explained by the overlapped collision of electrons with the barrier ribs on the anode side. More specifically, the electrons that are accelerated by the electric field move along the discharge electrode on the anode side, and finally collides with the barrier ribs to charge up the ribs. Thus, assumably, this leads to the development of an electric field as to cancel out the discharge electric field. It can be seen from the foregoing that an exposed electrode width of 40 μm or more is particularly requisite in generating a stable discharge in a plasma chamber structure having the barrier ribs formed along the discharge electrodes.

Figure 5:
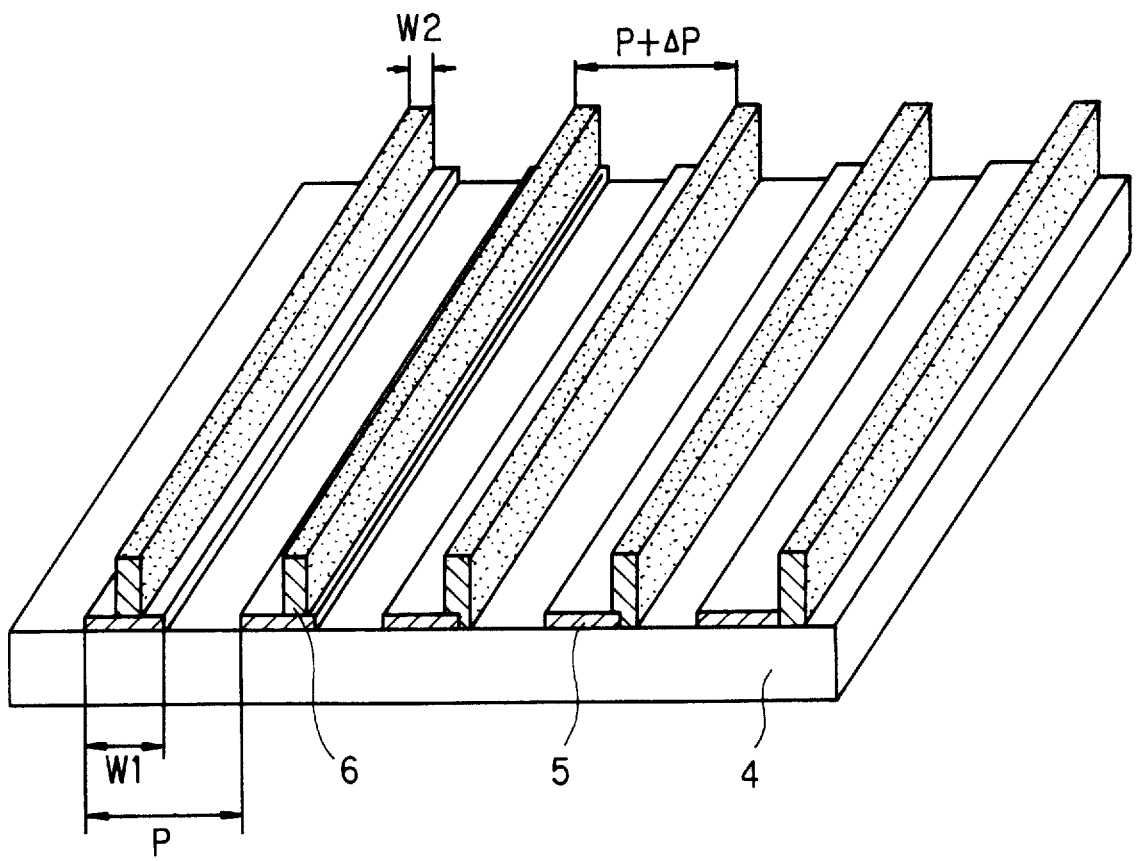
FIG. 5 is a schematically drawn perspective view of a structure obtained in the fabrication of a plasma-addressed display device according to a conventional process, provided as an explanatory means for showing the problems.

A preferred method for producing the discharge electrodes with desired exposed width is described below. To make the process more easily understood, the disadvantages in a prior art process are first pointed out. Referring to FIG. 5, a prior art process comprises printing the discharge electrodes 5 and the barrier ribs 6 each by using stripe-patterned screen masks. By principle, the discharge electrodes 5 and the barrier ribs 6 are disposed at the same arrangement pitch P, but with differing pattern widths $W_1$ and $W_2$. Thus, screen masks patterned differently from each other were used for forming the discharge electrodes 5 and the barrier ribs 6. Thus, the screen masks for use in a conventional process must have the same pitch for the stripe pattern and must be aligned with high accuracy. The screen mask is obtained by stretching a screen mesh on a frame while applying tension to the mesh. A predetermined stripe pattern is thus formed on the screen mesh coated with a photosensitive material by means of photolithography. However, it can be seen that it is extremely difficult to set the pitch P of the stripe patterns completely in the same value, because a constant error ΔP is included in the actual value P. Moreover, in the practical thick film printing, a pressure is applied to the screen mask due to the use of a squeegee, and this induces the deformation of the screen mask. Thus, it can be seen that the practical pitch obtained as a result deviates from the targeted value. Conclusively, a so-called pitch misalignment occurs, because an accurate alignment of the stripe pattern on the upper layer with that on the lower layer is practically unfeasible.

In the novel process according to the present invention, the discharge electrodes and the barrier ribs are fabricated using the same screen mask. This process also takes advantage of the fact that wider printed lines are obtained, due to sagging, by printing a paste of low viscosity to a glass substrate having a smooth and flat surface. On the contrary, finer printed lines are obtainable by printing a paste of high viscosity on a base having a rough surface.

Figure 6A:
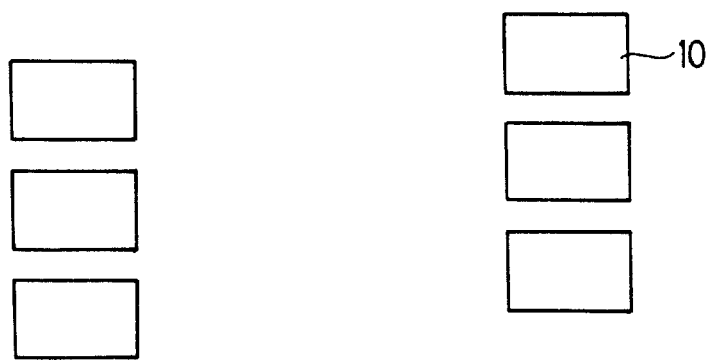
FIGS. 6 (A) to 6 (C) are a diagram showing the process steps in fabricating discharge electrodes and barrier ribs.
Figure 6B:
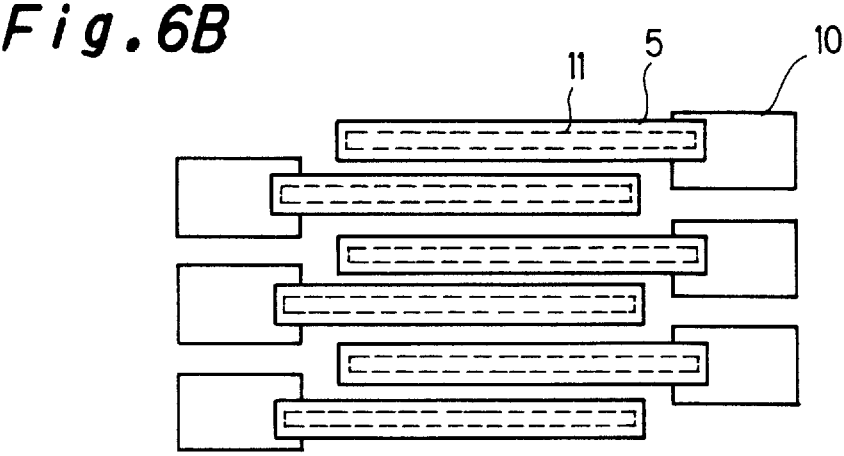
Figure 6C:
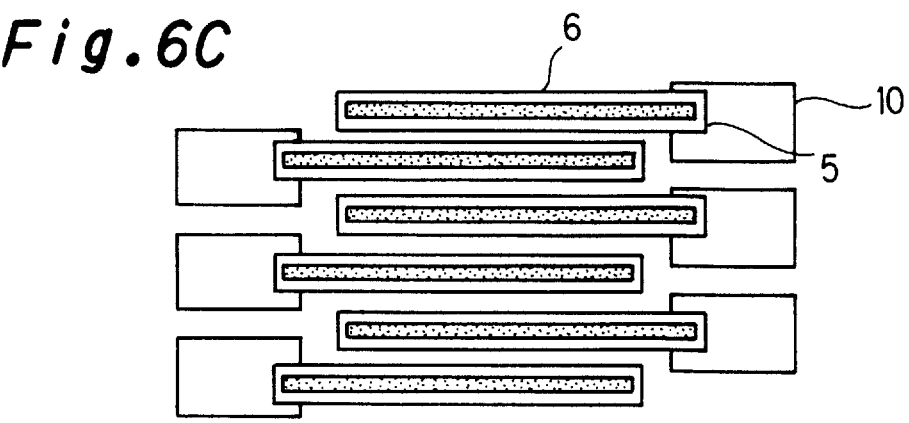
Figure 7:
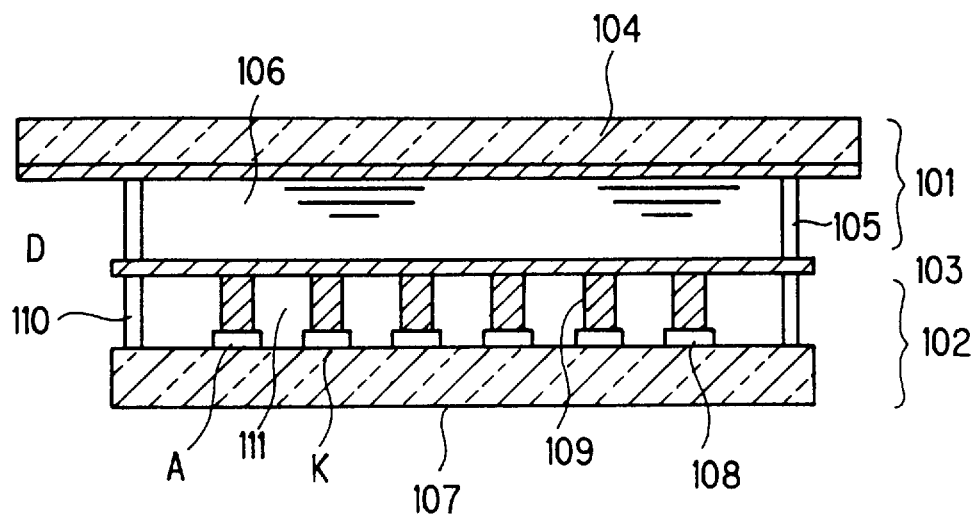
FIG. 7 is a cross section view showing a general constitution of a conventional plasma-addressed display device.

Referring to FIGS. 6 (A) to 6 (C), the process is described in further detail below. First referring to Fig. (A), lead electrodes 10 for use in the intraconnection are fabricated on the surface of the glass substrate by screen printing. The lead electrodes 10 for use in the electric connection with the external circuits are printed thereafter using another screen mask, but the margin for this portion is sufficiently large because this portion need only be assured of electrical connection. In FIG. 6 (B), wide discharge electrodes 5 are fabricated by using a screen having a predetermined stripe pattern 11 and by applying a conductive paste having a low viscosity to a glass substrate having a smooth surface. As described in the foregoing, this process utilizes the sagging nature of the low-viscosity paste applied to a smooth surface. Referring then to FIG. 6 (C), the same screen mask as used in the fabrication of the discharge electrodes 5 is used to form the fine barrier ribs 6, except for applying an insulating paste having a high viscosity to the rough surface of the discharge electrodes 5. Hence, by utilizing the nature of the viscous paste which undergoes less sagging, fine barrier ribs 6 can be readily obtained by using the same screen mask as that employed in forming the discharge electrodes 5. Barrier ribs 6 having the desired height are then completed by repeatedly effecting the screen printing process. A complete plasma chamber structure as illustrated in FIG. 1 can be obtained by solidifying the printed paste by subjecting the printed structure to a heat treatment effected according to a predetermined temperature control. Thus, a plasma chamber comprising wide discharge electrodes having the narrower barrier ribs formed thereon can be obtained by using a single screen mask. By using a screen mask having a pattern composed of 120 μm wide stripes in an experiment, 110 μm wide barrier ribs were fabricated superposed on 250 μm wide discharge electrodes without causing misalignment. Furthermore, it was confirmed in this case that discharge electrodes were exposed on both sides of each of the barrier ribs at a width of 50 μm or more. For reference, a conventional process comprises forming printed discharge electrodes from about 280 to 300 μm in width by using a screen mask having a 140 to 170 μm wide stripe patterns, and then forming thereon barrier ribs about 110 μm in width by using a screen mask having a 120 μm wide stripe pattern. The characteristics of the process according to the present invention is summarized in Table 1 below.

TABLE 1

| | Base | Paste | Sagging | Printed Line Width Using a 120-μm Striped Screen |
|---|---|---|---|---|
| Electrodes | glass (smooth surface) | Low viscosity | High | about 250 μm |
| Barrier Ribs | electrodes (rough surface) | High viscosity | Low | about 110 μm |

As mentioned in the foregoing, the plasma-addressed display device according to the present invention can be fabricated with improved product yield because the problem of defective discharge can be overcome completely. This is realized by printing the discharge electrodes and the barrier ribs using the same screen mask for both, thereby eliminating the unfavorable pitch mismatch and misalignments. In this manner, sufficiently wide exposed electrodes can be disposed over the entire plasma chamber to assure regular discharge. More specifically, the plasma-addressed display device according to the present invention affords an alignment margin of within ±225 μm, i.e., a digit higher than the value required in a conventional display device of ±25 μm. Thus, the plasma-addressed display device according to the present invention fabricated by a novel method utilizing the same screen for both the discharge electrodes and the barrier ribs can be implemented by the present-day screen printing technology. Furthermore, the plasma-addressed display device according to the present invention enables the mass production of large plasma-addressed display devices having a size in the order of meters.

While the invention has been described in detail and with reference to specific embodiments thereof, it will be apparent to one skilled in the art that various changes and modifications can be made therein without departing from the spirit and scope thereof.

What is claimed is:

1. A plasma-addressed display device, comprising:
   a first substrate having a plurality of data electrodes arranged in parallel to each other;
   a dielectric sheet, the first substrate and the dielectric sheet being disposed face-to-face to form a display chamber therebetween;
   a second substrate having a plurality of discharge electrodes, and
   a plurality of barrier ribs each of which is located on one of the discharge electrodes to define a discharge channel between adjacent barrier ribs, said barrier ribs covering a portion of said discharge electrodes to prevent electrical discharge at covered portions of said discharge electrodes, the second substrate and the dielectric sheet being disposed face-to face to form a discharge chamber therebetween, the data electrodes and discharge channel being arranged so that they are spaced apart in the vertical and horizontal directions, respectively, each of the discharge electrodes having a width larger than the respective one barrier rib to provide exposed portions of the discharge electrodes at each side of the barrier rib so that the pair of the discharge electrodes belonging to each of the discharge channels is exposed on the glass substrate at the bottom of the corresponding barrier each for a length of 40 μm or more as measured along the width direction of the discharge chamber, said discharge electrodes being exposed for a width of less than 50 percent of a pitch of said electrodes from one another, said exposed surface being a top surface of said discharge electrodes facing and spaced from said dielectric sheet each of said barrier ribs being of substantially a same height as a width of said discharge electrodes, said height of said barrier ribs and said width of said discharge electrodes being approximately 200 μm.

2. A plasma-addressed display device as claimed in claim 1, wherein, each of the discharge electrodes is a printed discharge electrode.

3. A plasma-addressed display device as claimed in claim 2, wherein, each of the barrier ribs is a printed barrier rib.

4. A plasma-addressed display device as claimed in claim 3, wherein, the discharge electrodes and barrier ribs comprise a conductive pattern and an insulating pattern, respectively, which are obtained by printing one of the patterns superposed on the other using the same screen mask.

5. A plasma-addressed display device as claimed in claim 1, wherein, each of the barrier ribs is a printed barrier rib.

6. A plasma-addressed display device as claimed in claim 1, wherein, the apices of the barrier ribs are placed in contact with the dielectric sheet.

7. A plasma-addressed display device, comprising:
   a first substrate having a plurality of data electrodes arranged in parallel to each other;
   a dielectric sheet, the first substrate and the dielectric sheet being disposed face-to-face to form a display chamber therebetween;
   a second substrate having a plurality of discharge electrodes, and
   a plurality of barrier ribs each of which is located on one of the discharge electrodes to define a discharge channel between adjacent barrier ribs, said barrier ribs covering a portion of said discharge electrodes to prevent electrical discharge at covered portions of said discharge electrodes, the second substrate and the dielectric sheet being disposed face-to face to form a discharge chamber therebetween, the data electrodes and discharge channel being arranged so that they are spaced apart in the vertical and horizontal directions, respectively, each of the discharge electrodes having a width larger than the respective one barrier rib to provide exposed portions of the discharge electrodes at each side of the barrier rib so that the pair of the discharge electrodes belonging to each of the discharge channels is exposed on the glass substrate at the bottom of the corresponding barrier each for a length of 40 μm or more as measured along the width direction of the discharge chamber, said discharge electrodes being exposed for a width of less than 50 percent of a pitch of said electrodes from one another, said exposed surface being a top surface of said discharge electrodes facing and spaced from said dielectric sheet, each of said barrier ribs being of a height of approximately 200 μm, each of said discharge electrodes being of a width of approximately 210 μm.

8. A plasma-addressed display device, comprising:
   a first substrate having a plurality of data electrodes arranged in parallel to each other;

a dielectric sheet disposed face-to-face to the first substrate to form a display chamber therebetween;

a second substrate spaced from said dielectric sheet to form a discharge space therebetween;

a plurality of discharge electrodes on said second substrate on a surface facing said dielectric sheet, said discharge electrodes being elongated in a direction substantially perpendicular to said data electrodes and being parallel to one another, said discharge electrode having top surfaces facing said dielectric sheet and spaced from said dielectric sheet, said top surfaces of said discharge electrodes each being of a predetermined width, said discharge electrodes being spaced from one another by a predetermined pitch; and a plurality of barrier ribs extending parallel to one another between said dielectric sheet and said top surface of said discharge electrodes to define discharge channels, said barrier ribs being elongated in a same direction as said discharge electrodes, each of said barrier ribs being on a corresponding one of said discharge electrodes, said barrier ribs covering a portion of said top surfaces, said barrier ribs being of a lesser width than said predetermined width of said discharge electrodes so that exposed portions of said top surfaces are free of said barrier ribs and exposed in said discharge chamber for electrical discharge on both sides of said barrier ribs, said exposed portions being less than 50 percent of said predetermined pitch, said exposed portion of each of said discharge electrodes being at least 40 $\mu$m in a width direction on each side of said barrier to ribs.

* * * * *